3,287,367
DIHYDROBENZOTHIEPINS
Richard J. Mohrbacher, Fort Washington, Pa., assignor to McNeil Laboratories, Incorporated, a corporation of Pennsylvania
No Drawing. Filed June 8, 1965, Ser. No. 462,396
13 Claims. (Cl. 260—327)

This invention relates to certain novel dihydrobenzothiepins. More particularly, this invention is concerned with dihydrobenzothiepins having the formula

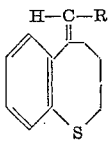

where R is a member selected from the group consisting of cyano, aminomethyl, diloweralkylaminoloweralkyl, carboxyl, loweralkoxycarbonyl and diloweralkylcarbamoyl; and non-toxic acid addition salts and loweralkyl quaternary ammonium derivatives of the basic nitrogen containing compounds.

As used herein loweralkyl may be straight or branch chained and have from 1 to 6 carbon atoms, such as, for example, methyl, ethyl, propyl, isopropyl, butyl, isobutyl, tertiary butyl and the like.

It is understood that in certain cases the exo double bond at the 5 position may occupy the 4,5-endo positions.

The therapeutically active non-toxic acid addition salts of those compounds containing a basic nitrogen are prepared by treatment with an appropriate acid such as an inorganic acid, e.g., hydrochloric, hydrobromic, hydriodic, sulfuric, nitric or phosphoric; an organic acid such as acetic, propionic, glycolic, lactic, pyruvic, succinic, maleic, malic, fumaric, tartaric, citric, benzoic, mandelic, cinnamic, methane sulfonic, benzene sulfonic, salicylic, 2-phenoxybenzoic. Conversely, the salt form may be converted in the usual manner into the free base.

Those novel compounds containing a basic nitrogen may be converted into the corresponding quaternary ammonium compounds by reaction of the tertiary bases with alkylating agents, i.e., alkyl or aralkyl halides or esters formed by reacting alkanols with an oxygen-containing acid such as methyl iodide, ethyl bromide, propyl chloride; lower alkenyl halides—allyl bromide; dilower alkylsulfates—dimethylsulfate, diethylsulfate; lower alkylarylsulfonates—methyl p-toluenesulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are ethers such as benzene and heptane, ketones such as acetone and butanone, lower alkanols such as ethanol, propanol or butanol; or organic acid amides such as formamide or dimethylformamide. When loweralkyl halogenides are used as quaternizing agents, diethyl ether and benzene are the preferred solvents.

The compounds of this invention have valuable pharmacological properties in view of their hypotensive activity.

The compound of this invention wherein R is cyano is prepared by reacting a solution of diethylcyanomethylphosphonate with a strong base such as an alkali metal hydride or amide such as sodium hydride or sodamide in a suitable organic solvent such as monoglyme, benzene or tetrahydrofuran and thereafter adding 3,4-dihydro-1-benzothiepin-5(2H)-one and allowing the reaction to go to completion, preferably at elevated temperatures.

The compound of this invention wherein R is aminomethyl is prepared by reacting 3,4-dihydro-1-benzothiepin-$\Delta^{5(2H),\alpha}$-acetonitrile with a reducing agent such as lithium aluminum hydride in a suitable solvent such as anhydrous ether.

The compound of this invention wherein R is dimethylaminomethyl is prepared by methylating 3,4-dihydro-1-benzothiepin-$\Delta^{5(2H),\beta}$-ethylamine with formaldehyde-formic acid under Clark-Eschweiler reaction conditions.

The compounds of this invention wherein R is diloweralkylaminoloweralkyl other than diloweralkylaminomethyl are prepared by dehydrating a 5-diloweralkylaminoloweralkyl-2,3,4,5-tetrahydro-1-benzothiepin-5-ol with a suitable acid catalyst such as sulfuric acid, potassium acid sulfate or hydrochloric acid. The 5-diloweralkylaminoloweralkyl-2,3,4,5-tetrahydro-1-benzothiepin-5-ols are prepared by reacting 3,4-dihydro-1-benzothiepin-5(2H)-one in a suitable solvent such as ether or tetrahydrofuran with the Grignard reagent prepared from the reaction of the appropriate diloweralkylaminoloweralkyl halide such as the chloride with magnesium.

The compound of this invention wherein R is ethyloxy carbonyl is prepared by reacting triethylphosphonoacetate with a strong base such as an alkali metal hydride or amide such as sodium hydride or sodamide in a suitable organic solvent such as monoglyme, benzene or tetrahydrofuran and thereafter adding under reflux conditions 3,4-dihydro-1-benzothiepin-5(2H)-one in a solvent such as monoglyme. By another method the compound can be prepared by reacting 3,4-dihydro-1-benzothiepin-5(2H)-one with ethyl bromoacetate and zinc under Reformatsky reaction conditions, followed by dehydration of the resulting 2,3,4,5-tetrahydro-5-hydroxy-1-benzothiepin-5-acetate with a suitable acid catalyst as described hereinabove.

In place of lithium aluminum hydride as a reducing agent in the foregoing procedures, reducing agents such as the boron hydrides, for example diborane or alkyl boranes; or alkali metal borohydrides combined with a Lewis acid, for example sodium borohydride—aluminum chloride, or potassium borohydride—boron trifluoride may be used. The solvent may be a suitable inert organic solvent such as tetrahydrofuran, diethylether, or ethylene glycol dimethyl ether.

The compounds of this invention wherein R is diloweralkylcarbamoyl are prepared by converting 3,4-dihydro-1-benzothiepin-$\Delta^{5(2H),\alpha}$-acetic acid to a suitable reactive intermediate such as the acid halide or anhydride and thereafter reacting with a diloweralkylamine. In the preferred method, 3,4-dihydro-1-benzothiepin-$\Delta^{5(2H),\alpha}$-acetic acid is converted to the mixed anhydride, using triethylamine and ethyl chloroformate in a suitable solvent such as toluene and thereafter reacting with a diloweralkylamine.

The following examples are intended to illustrate, but not to limit, the scope of the present invention.

*Example 1*

A solution of 36.4 g. (0.22 mole) of diethylcyanomethylphosphonate in 65 ml. of freshly distilled monoglyme is added to a stirring slurry of sodamide (7.7 g., 0.2 mole) in 200 ml. of monoglyme. The slurry is stirred at room temperature for 1 hour. A solution of 35.6 g. (0.2 mole) of 3,4-dihydro-1-benzothiepin-5(2H)-one in 70 ml. of monoglyme is added dropwise over a period of 25 minutes. The resulting slurry is refluxed for 2 hours and then poured into 1 liter of ice water. Extraction of the aqueous mixture with benzene-ether yields, after drying and concentration of the organic layer, a crude oil which is distilled (130–140° C./0.35 mm.). Crystals are obtained by scratching. After 4-recrystallizations from ethyl acetate-hexane, the product recovered is 3,4-dihydro-1-benzothiepin-$\Delta^{5(2H),\alpha}$-acetonitrile; M.P. 78–80° C.

Example II

To a stirred slurry of 14.8 g. (0.39 mole) of lithium aluminum hydride in 300 ml. of anhydrous ether is added a solution of 26 g. (0.129 mole) of 3,4-dihydro-1-benzothiepin-$\Delta^{5(2H),\alpha}$-acetonitrile in 200 ml. of ether. The slurry is stirred for 18 hours at room temperature and is then heated at reflux temperature for 90 minutes. After decomposition with water and filtration, the filtrate is concentrated in vacuo to give 3,4-dihydro-1-benzothiepin-$\Delta^{5(2H),\beta}$-ethylamine as an oil. Conversion of the oil to the hydrochloride salt in dilute aqueous hydrochloric acid yields crystals of the product. After 2 recrystallizations from ethyl alcohol the product, 3,4-dihydro-1-benzothiepin-$\Delta^{5(2H),\beta}$-ethylamine hydrochloride, is in the form of white crystals; M.P. 245–246° C.

Example III

A 2 g. (0.01 mole) sample of 3,4-dihydro-1-benzothiepin-$\Delta^{5(2H),\beta}$-ethylamine is heated under reflux with 2.3 ml. of 37 percent formaldehyde and 2.56 g. of 90 percent formic acid for 8 hours. Five ml. of 4 N hydrochloric acid are added and the solution is concentrated in vacuo. The residue is dissolved in water, made basic with sodium hydroxide and extracted with benzene. The organic layer is washed with brine, dried over potassium carbonate and concentrated in vacuo to give an oil, 3,4-dihydro-N,N-dimethyl-1-benzothiepin-$\Delta^{5(2H),\beta}$-ethylamine.

Example IV

A 24.9 g. (0.02 mole) sample of freshly distilled dimethylaminopropylchloride in 100 ml. of dry ether is added dropwise with stirring over 45 minutes to a warm mixture of 4.9 g. (0.02 mole) of magnesium turnings, a few crystals of iodine and 5 drops of methyl iodide in 100 ml. of ether. The stirred mixture is heated to reflux and 17.8 g. (0.1 mole) of 3,4-dihydro-1-benzothiepin-5(2H)-one in 335 ml. of dry benzene is added dropwise over 90 minutes. Considerable amounts of magnesium are present. After 20 hours stirring at reflux almost no magnesium is observed. After cooling, the reaction mixture is treated with 235 ml. of 10 percent ammonium chloride solution and then with 235 ml. of water. The organic layer is separated and the aqueous phase is extracted 2 times with ether. The combined organic phase is washed with water and is dried over magnesium sulfate. After removal of the drying agent, the solution is diluted to 1 liter with benzene and divided into 500 ml. aliquot portions. One 500 ml. aliquot is shaken with 200 ml. of 2.9 M of aqueous hydrochloric acid, causing white crystals to precipitate. These crystals are collected by filtration and dried. The crystals are stirred in 250 ml. of boiling isopropanol and filtered hot. The filtrate is cooled. The resulting crystals are recrystallized from ethanol-ether. The crystals from the several fractions are recrystallized from ethanol-ether to give white plates of 5-(3-dimethylaminopropyl)-2,3,4,5-tetrahydro-1-benzothiepin-5-ol hydrochloride; M.P. 207° C.

Example V

A 6 g. (0.0226 mole) sample of 5(3-dimethylaminopropyl)-2,3,4,5-tetrahydro-1-benzothiepin-5-ol is dissolved in 18 ml. of 2 M sulfuric acid (0.036 mole) and the solution is refluxed for 2 hours. After cooling, the solution is extracted with ether and the aqueous phase is made basic with 10 percent sodium hydroxide solution. The oily base is taken up in ether and the ether solution is washed with water, dried (MgSO$_4$), and evaporated to give an oil. Distillation at 128–134° C./0.05 mm. yields an oil which is converted to the hydrochloride salt in 2-propanol using ethereal hydrochloric acid. The salt is recrystallized once from ethanol-ether and twice from acetone-ether to give white crystals of 3,4-dihydro-N,N-dimethyl-1-benzothiepin-$\Delta^{5(2H),\gamma}$-propylamine hydrochloride; M.P. 155–156° C.

Example VI

A solution of 16.2 g. (0.072 mole) of triethylphosphonoacetate in 20 ml. of monoglyme is added dropwise to a stirred slurry of 1.6 g. (0.065 mole) of sodium hydride in 100 ml. of dry monoglyme. The reaction is slightly exothermic and is stirred with no additional heat for 45 minutes. A solution of 10.7 g. (0.06 mole) of 3,4-dihydro-1-benzothiepin-5(2H)-one in 30 ml. of monoglyme is added dropwise and the solution is refluxed for 3 hours. After cooling, the solution is poured into 500 ml. of water and extracted with ether-benzene. The organic layer is dried and concentrated in vacuo to a golden oil. Distillation yields a material which by infrared spectrum contains some starting ketone. A second distillation (122–140° C./0.075 mm.) yields a colorless oil, ethyl 3,4-dihydro-1-benzothiepin-$\Delta^{5(2H),\alpha}$-acetate.

Example VII

An 8.5 g. (0.13 mole) quantity of purified (washed with 5 percent sodium hydroxide, water, dilute acetic acid, water, then acetone and dried) zinc dust, 35.6 g. (0.2 mole) of 3,4-dihydro-1-benzothiepin-5(2H)-one, 25.0 g. (0.15 mole) of ethylbromoacetate and a few crystals of iodine are combined in 500 ml. of anhydrous benzene: ether (1:1). Five additions of 8.5 g. portions of zinc dust and a trace of iodine are made at 45 minute intervals and an additional 25 g. of ethyl bromoacetate is added after 90 minutes. The gray slurry is refluxed for 5 hours with stirring and is then treated with a solution of 15 ml. of 0.02 M acetic acid containing 5 ml. of methanol. The mixture is poured into 250 ml. of water and then acidified with dilute acetic acid. The organic layer is separated and the aqueous layer is washed with ether-benzene solution. The combined organic layer is washed successively with dilute acetic acid, water and saturated brine. After drying over magnesium sulfate, the solvents are removed in vacuo to give an oil. The oil is crystallized by freezing and scratching in a Dry Ice bath. The solid is dissolved in petroleum ether (30–60° C.). Cooling gives platelets. One recrystallization from petroleum ether (after Darco G-60) yields colorless platelets of ethyl 2,3,4,5-tetrahydro-5-hydroxy-1-benzothiepin-5-acetate; M.P. 44.5–46° C.

Example VIII

An alternative method for preparing the compound of Example VI is the following. An 8 g. (0.031 mole) quantity of ethyl 2,3,4,5-tetrahydro-5-hydroxy-1-benzothiepin-5-acetate is suspended in 20 ml. of 4 M sulfuric acid and sufficient ethanol (ca. 45 ml.) is added to effect solution. The solution is stirred at reflux for 6½ hours and is partially concentrated in vacuo. The resulting emulsion is diluted with ether and the organic layer is collected. The aqueous layer is extracted twice with ether-benzene solution. The combined organic layer is washed once with water and then saturated brine and dried over sodium sulfate. After removal of the drying agent the solvents are removed in vacuo to give a yellow oil. A quantity of the oil is distilled and the fraction boiling at 123° C./0.175 mm. is collected. The product is ethyl 3,4-dihydro-1-benzothiepin-$\Delta^{5(2H),\alpha}$-acetate.

Example IX

A 49.2 g. (0.2 mole) quantity of crude, undistilled ethyl 3,4-dihydro-1-benzothiepin-$\Delta^{5(2H),\alpha}$-acetate is heated at reflux temperature with 150 ml. of 95 percent ethanol, 40 g. of potassium hydroxide and 10 ml. of water. After 3 hours the ethanol is removed. The residue is dissolved in a small amount of water and extracted with benzene-ether. The aqueous layer is acidified with hydrochloric acid. Crystals form in 48 hours. The crystals are removed by filtration and dried. Two recrystallizations from acetone yields white crystals of 3,4-dihydro-1-benzothiepin-$\Delta^{5(2H),\alpha}$-acetic acid; M.P. 197–199° C. The product is one of the two isomers (cis, trans).

A 29 g. (0.117 mole) sample of ethyl 3,4-dihydro-1-benzothiepin-$\Delta^{5(2H),\alpha}$-acetate is refluxed in 115 ml. of 20 percent potassium hydroxide and 60 ml. of 95 percent ethanol for 6 hours. The alcohol is removed in vacuo and the resultant slurry is dissolved in water. The solution is extracted with benzene-ether solution. The aqueous layer is made neutral with glacial acetic acid. A gum separates. The gum is collected by decantation and the supernatant layer is extracted with methylene chloride. The gum is dissolved in the methylene chloride solution. The solution is evaporated to leave a solid. The solid is recrystallized from acetone-water solution to give crystals; M.P. 158–162° C. Another recrystallization from acetone-water gives white crystals of 3,4-dihydro-1-benzothiepin-$\Delta^{5(2H),\alpha}$-acetic acid; M.P. 163–165° C. The product is one of the two isomers (cis, trans).

*Example X*

To a solution of 6.6 g. (0.03 mole) of 3,4-dihydro-1-benzothiepin-$\Delta^{5(2H),\alpha}$-acetic acid (M.P. 160–164° C.) in 30 ml. of toluene cooled to 0° C. is added 3.5 g. (0.03 mole) of triethylamine followed by 3.47 g. (0.032 mole) of ethylchloroformate. The slurry is stirred at 0° C. for 90 minutes. A solution of 2.5 g. (0.056 mole) of dimethylamine in 15 ml. of toluene is added dropwise and the mixture is stirred at 0° C. for 12 hours and then at 25° C. for 4 hours. The mixture is treated with water and the organic layer is washed successively with 10 percent sodium hydroxide solution, water, dilute hydrochloric acid, water and saturated brine. After drying over magnesium sulfate, the solvents are removed in vacuo to give an oil. The oil is dissolved in ether and extracted with acid, base and water as above to give an oil which is distilled at 172–8° C./0.45 mm. The product is 3,4-dihydro-N,N-dimethyl-1-benzothiepin $\Delta^{5(2H),\alpha}$-acetamide.

*Example XI*

Using the procedures of Examples IV and V and replacing in Example IV dimethylaminopropyl chloride with equivalent amounts of diethylaminoethyl chloride and 3-diethylamino-2-methylpropyl chloride, the products obtained are:

3,4 - dihydro - N,N - diethyl - 1 - benzothiepin - $\Delta^{5(2H),\beta}$-ethylamine, and, 3,4 - dihydro - N,N - diethyl - 1 - benzothiepin - $\Delta^{5(2H),\gamma}$-2-methylpropylamine.

*Example XII*

Using the procedure of Example X and replacing dimethylamine with equivalent amounts of diethylamine, dipropylamine and diisobutylamine, the products obtained are:

3,4 - dihydro - N,N - diethyl - 1 - benzothiepin - $\Delta^{5(2H),\alpha}$-acetamide;

3,4 - dihydro - N,N - dipropyl - 1 - benzothiepin - $\Delta^{5(2H),\alpha}$-acetamide, and, 3,4 - dihydro - N,N - diisobutyl - 1-benzothiepin-$\Delta^{5(2H),\alpha}$-acetamide.

What is claimed is:

1. A member selected from the group consisting of dihydrobenzothiepins having the formula

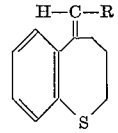

wherein R is a member selected from the group consisting of cyano, aminomethyl, diloweralkylaminoloweralkyl, carboxyl, loweralkoxycarbonyl and diloweralkylcarbamoyl; and non-toxic, acid addition salts and loweralkyl quaternary ammonium derivatives of the basic nitrogen-containing members.

2. 3,4 - dihydro - 1 - benzothiepin - $\Delta^{5(2H),\alpha}$-acetonitrile.

3. 3,4 - dihydro - 1 - benzothiepin - $\Delta^{5(2H),\beta}$-ethylamine.

4. 3,4 - dihydro - N,N - dimethyl - 1 - benzothiepin-$\Delta^{5(2H),\beta}$-ethylamine.

5. 3,4 - dihydro - N,N - dimethyl - 1 - benzothiepin-$\Delta^{5(2H),\gamma}$-propylamine.

6. Ethyl 3,4 - dihydro - 1 - benzothiepin - $\Delta^{5(2H),\alpha}$-acetate.

7. 3,4 - dihydro - 1 - benzothiepin - $\Delta^{5(2H),\alpha}$-acetic acid.

8. 3,4 - dihydro - N,N - dimethyl - 1 - benzothiepin-$\Delta^{5(2H),\alpha}$-acetamide.

9. 3,4 - dihydro - N,N - diethyl - 1 - benzothiepin-$\Delta^{5(2H),\beta}$-ethylamine.

10. 3,4 - dihydro - N,N - diethyl - 1 - benzothiepin-$\Delta^{5(2H),\gamma}$-2-methylpropylamine.

11. 3,4 - dihydro - N,N - diethyl - 1 - benzothiepin-$\Delta^{5(2H),\alpha}$-acetamide.

12. 3,4 - dihydro - N,N - dipropyl - 1 - benzothiepin-$\Delta^{5(2H),\alpha}$-acetamide.

13. 3,4 - dihydro - N,N - diisobutyl - 1 - benzothiepin-$\Delta^{5(2H),\alpha}$-acetamide.

No references cited.

WALTER A. MODANCE, *Primary Examiner.*

JAMES A. PATTEN, *Assistant Examiner.*